United States Patent

[11] 3,628,313

[72] Inventor Arnold Broadbent
 Shaw, England
[21] Appl. No. 826,550
[22] Filed May 21, 1969
[45] Patented Dec. 21, 1971
[73] Assignee Parker-Cramer (Great Britain) Ltd.
 Lancashire, England
[32] Priority June 4, 1968
[33] Great Britain
[31] 26,542/68

[54] APPARATUS FOR SEPARATING TEXTILE FIBERS FROM CONVEYING AIR
 7 Claims, 11 Drawing Figs.
[52] U.S. Cl. .................................................. 55/283, 55/290, 55/337, 55/400
[51] Int. Cl. .................................................. B01d 46/26
[50] Field of Search .......................................... 55/96, 97, 271–273, 283, 290, 337, 351–354, 432, 400; 210/402, 107

[56] References Cited
 UNITED STATES PATENTS
| 1,697,647 | 1/1929 | Hancock et al. | 55/290 |
| 2,125,574 | 8/1938 | Knight et al. | 55/290 |
| 2,500,123 | 3/1950 | Gwaltney et al. | 55/290 |
| 2,996,810 | 8/1961 | Cobb et al. | 55/352 |
| 3,008,543 | 11/1961 | Bourdale et al. | 55/283 |
| 3,486,313 | 12/1969 | Thomas | 55/400 |
| 3,415,040 | 12/1968 | Pool et al. | 55/283 |
| 3,525,198 | 8/1970 | Neitzel | 55/290 |

FOREIGN PATENTS
| 817,030 | 7/1959 | Great Britain | 55/290 |
| 580,956 | 9/1946 | Great Britain | 55/283 |

Primary Examiner—Frank W. Lutter
Assistant Examiner—Bernard Nozick
Attorney—Parrott, Bell, Seltzer, Park & Gibson ABSTRACT: An apparatus for separating textile fibers from a conveying airstream while utilizing collected fibers to augment filtering fibers, dust and the like from the conveying airstream, wherein the fiber-laden airstream is directed against and in generally tangential relation to a cylindrical filter drum within a confining casing to form a porous air-filtering batt of fibers on the drum while the filtered air is exhausted from within the drum. Upon a predetermined rise in air pressure (back pressure) within the casing incident to the buildup of fibers on the drum, the drum is automatically momentarily rotated in the opposite direction from the flow of the airstream to expose a previously shielded portion of the filter drum to the flow of air therethrough sufficient to relieve the back pressure in the casing as a portion of the batt previously formed is removed from the filter.

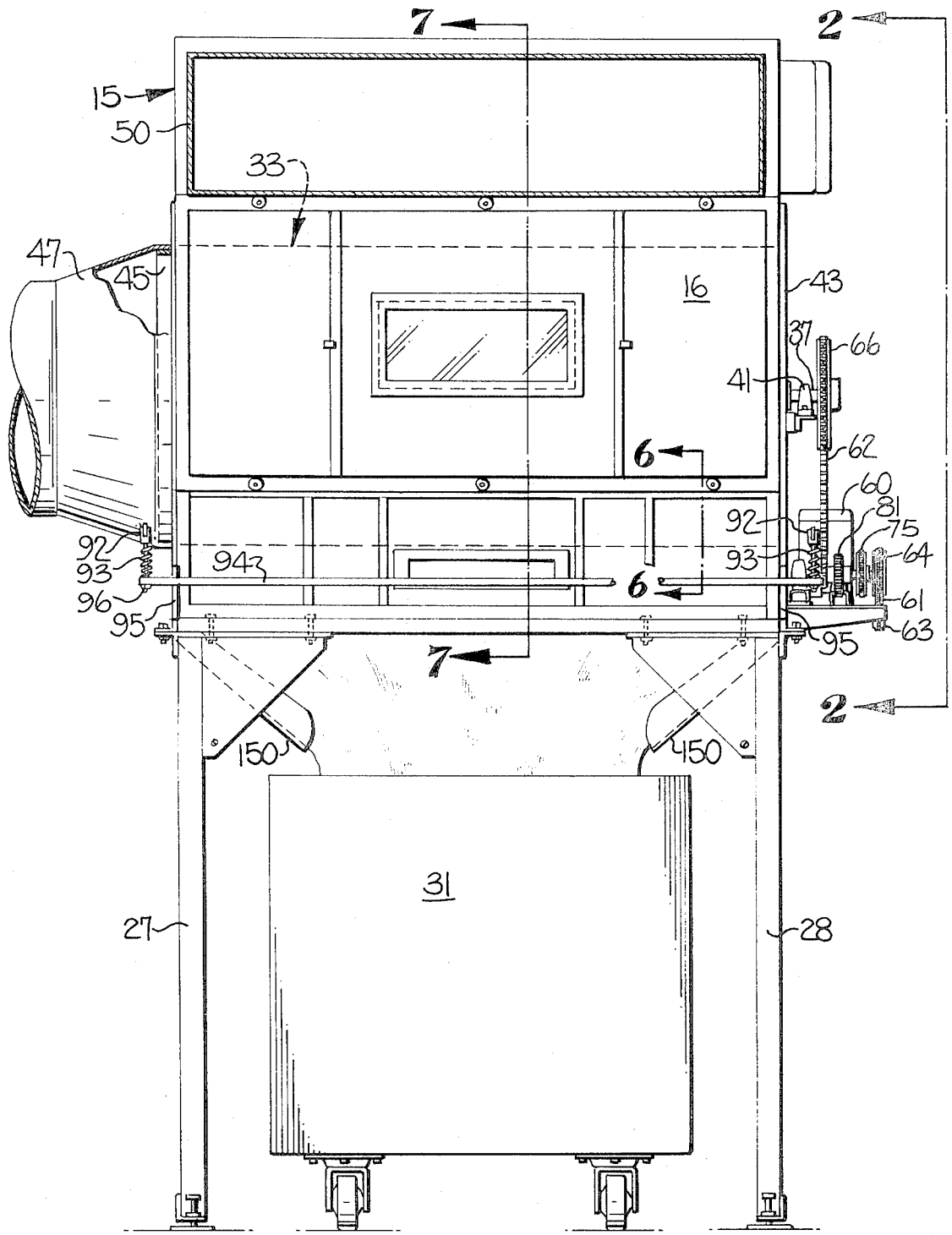

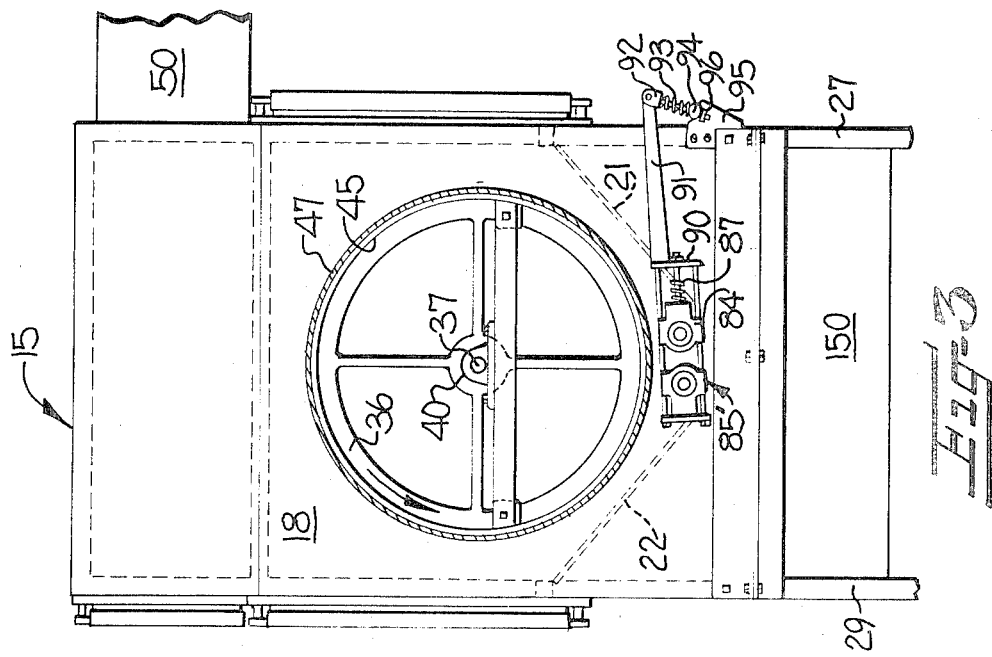
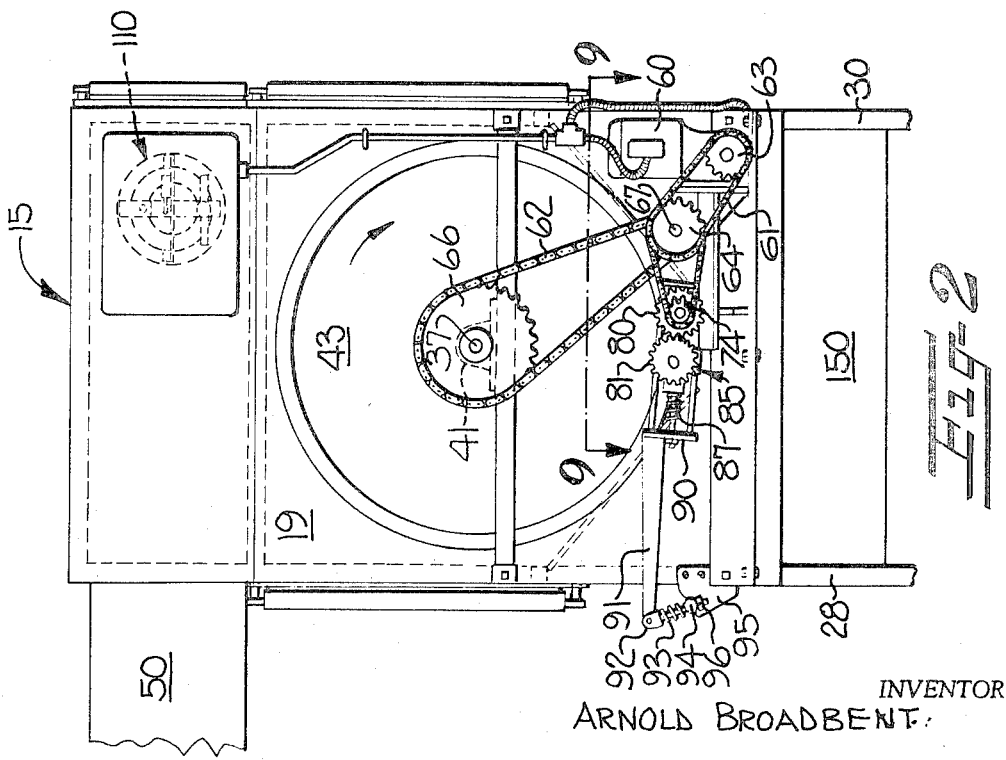

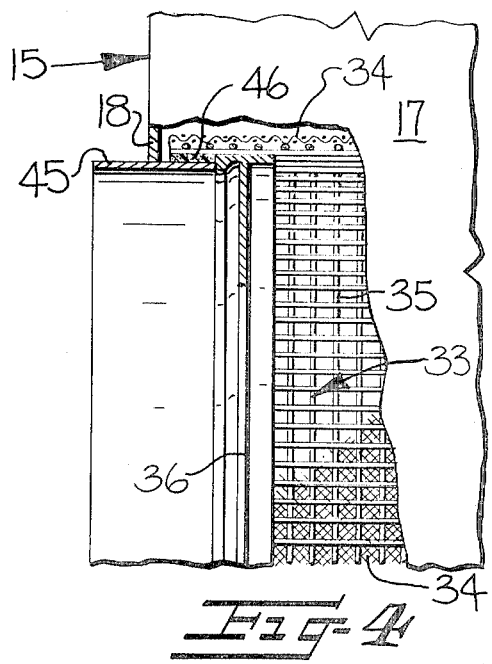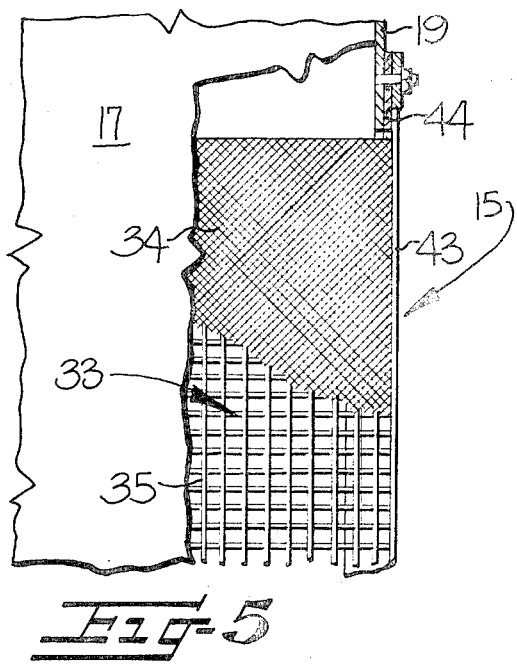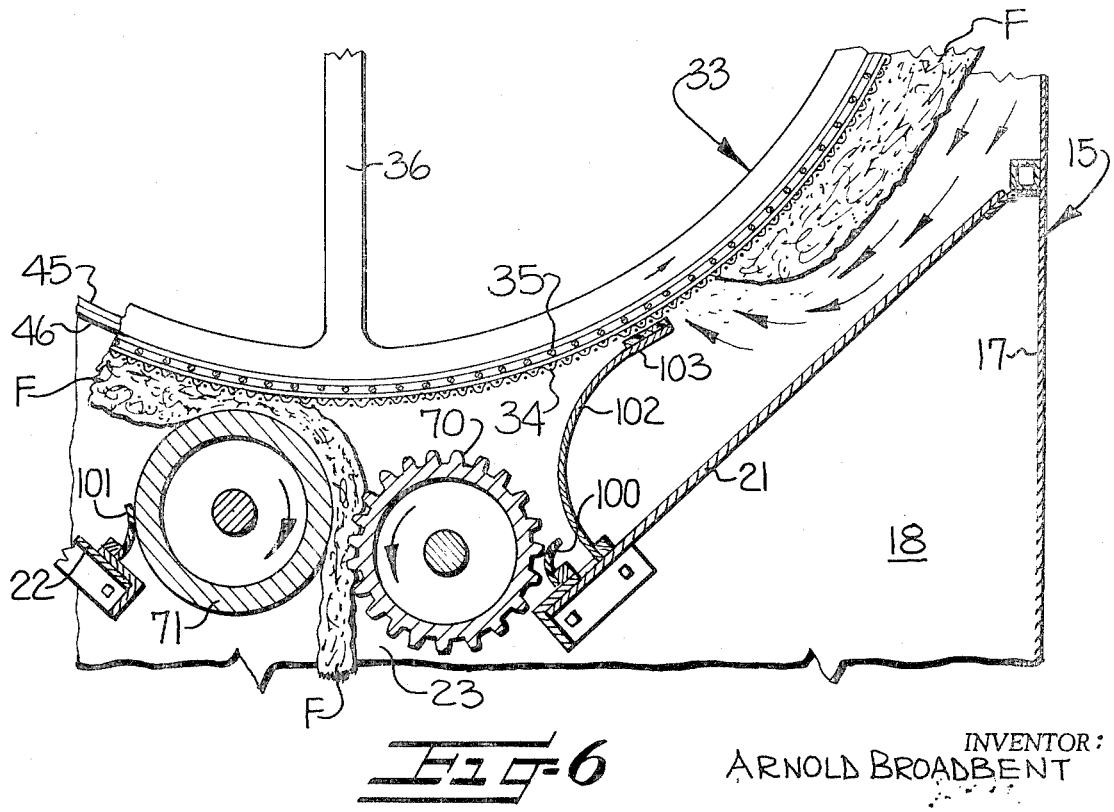

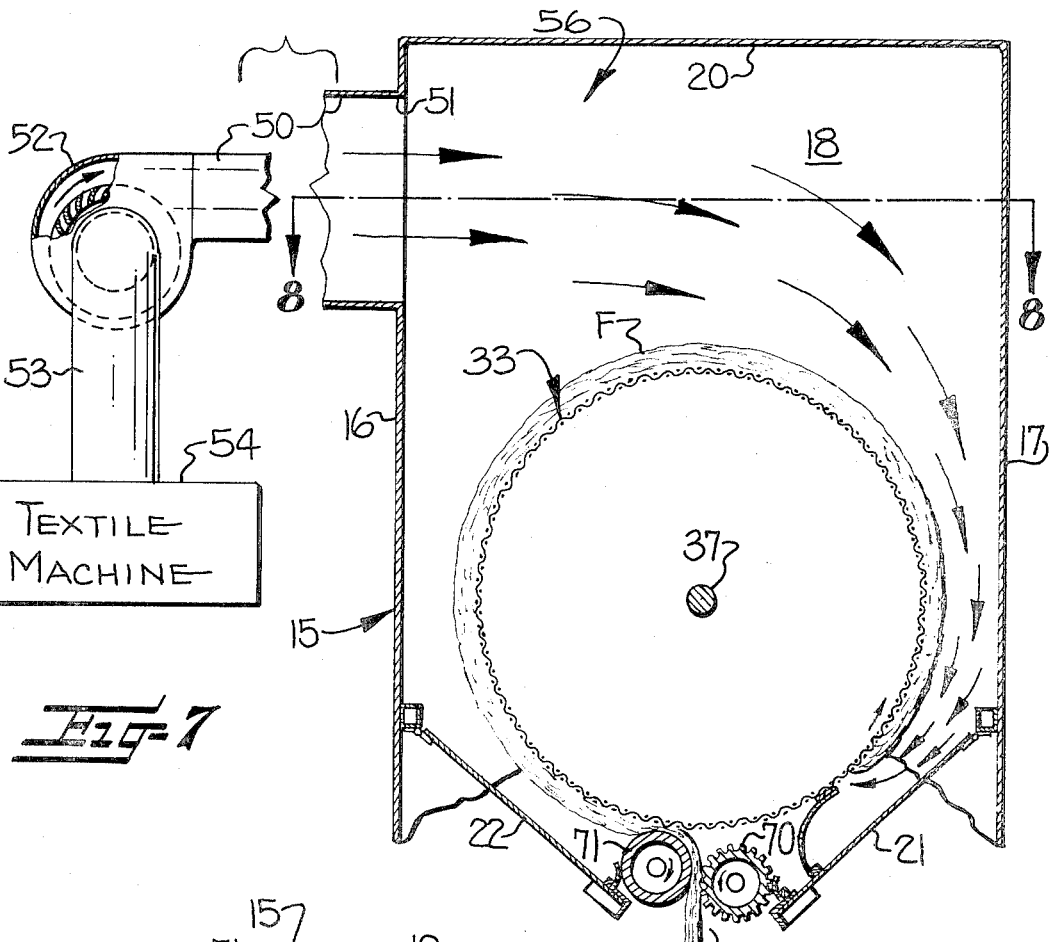
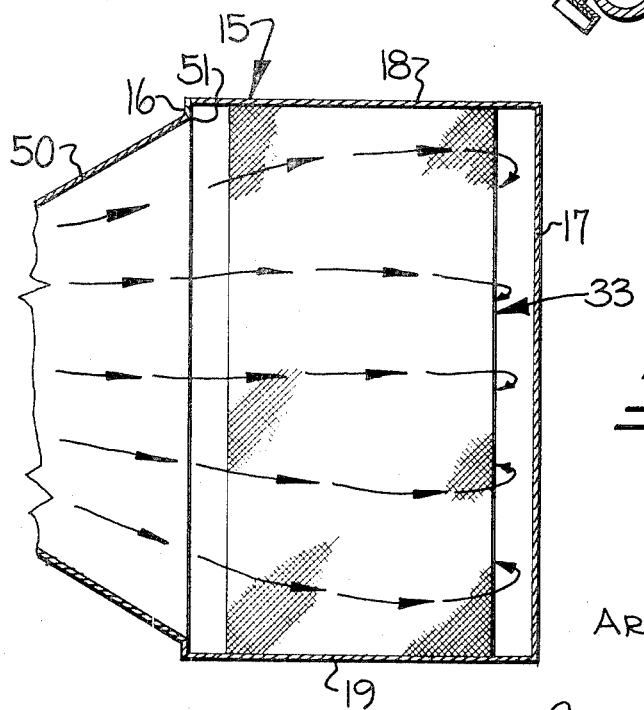

INVENTOR:
ARNOLD BROADBENT
BY Parrott, Bell, Seltzer, Park & Gibson
ATTORNEYS

APPARATUS FOR SEPARATING TEXTILE FIBERS FROM CONVEYING AIR

This invention relates to improvements in apparatuses for separating airborne textile fibers, fiber waste and other light particles from the air, and is particularly concerned with filter separator units of the type having a rotatable, generally cylindrical filter drum or cage through which the air is drawn or forced into the interior of the drum so as to leave the waste material adhering to the outer circumference thereof as a batt or blanket which is periodically removed from the drum by clearing rollers.

Various types of filtering systems have been in use for many years in textile mills for separating airborne textile fibers, fiber waste, dust and the like from a conveying airstream flowing from textile picking, opening and/or cleaning machinery. Among the most practical of known filtering systems are those which utilize a cylindrical filter drum positioned within a confining casing and upon which a bat of fibers is formed as fiber-laden air is directed into the casing against the filter drum and as the air is discharged through either or both ends of the filter drum. Such a filtering system is disclosed, for example, in U.S. Pat. No. 2,500,123, issued to E. D. Gwaltney et al. on Mar. 7, 1950.

Generally the filter medium of such known filtering systems is composed largely of the bat formed from the fibers filtered out of the airstream itself. Although these filters, as used heretofore, have performed quite well in their primary function of separating textile fibers from the airstream, substantial amounts of fine-particle waste material, such as silica dust, crushed cotton seeds and the like, have not been completely removed from the airstream. Therefore, it has been necessary heretofore to subject the airstream to a secondary filtering operation, usually by directing the airstream through a number of generally cylindrical, tightly woven, filter bags which must be emptied at intervals.

It is an object of this invention to provide an improved apparatus for effectively separating entrained textile fibers and impurities, such as dust and the like, for a conveying airstream, without the necessity of subjecting the airstream to a secondary filtering operation.

More specifically, the invention is apparatus for separating entrained textile fibers from a conveying airstream and collecting the fibers comprising a casing having an air inlet and an air outlet, means directing the fiber-conveying airstream through said inlet into said casing at predetermined pressure, a cylindrical filter drum within said casing and so positioned that the conveying airstream initially flows against the periphery of the said drum in a direction generally tangentially of said drum and flows through the cylindrical wall thereof and then axially outwardly through said outlet as the fibers are deposited upon the periphery of said drum in the form of a porous bat to progressively increase the filtration efficiency of said drum, compacting doffer roll means spaced substantial distance around said drum from said air inlet and positioned adjacent the periphery of said drum, and means responsive to a predetermined increase in air pressure within said casing incident to buildup of fibers on said drum for momentarily rotating said drum and said doffer roll means to remove a portion of the bat from said drum and expose a sufficient portion of the periphery of the drum to the flow of air therethrough to compensate for said increase in air pressure.

The invention includes apparatus for separating textile fibers from a conveying airstream and collecting the fibers while utilizing collected fibers to augment filtering the fibers, dust and the like from the conveying airstream which comprises means for directing the fiber-conveying airstream against and in generally tangential relation to the periphery of a cylindrical filter drum within a confining casing and at least partially around the drum in such a manner as to cause fibers to build up upon the drum and form a porous air-filtering batt of fibers on the drum, while exhausting filtered air from within the drum, while substantially shielding a relatively small area of the filter drum, remote from the point of initial impingement of the airstream against the drum, from the collection of fibers thereagainst and the flow of air therethrough, and automatically momentarily rotating the drum in the opposite direction from the flow of the airstream in response to a predetermined rise in air pressure within the casing incident to the buildup of fibers on the drum to expose a sufficient portion of the previously shielded area of the filter drum to the flow of air therethrough to compensate for the rise in air pressure, while removing a corresponding portion of the porous batt of fibers from the filter within the shielded area.

A preferred embodiment of the invention will now be described, by way of example, with reference to the accompanying drawings, in which:

FIG. 1 is an end elevation of a novel form of filter separator unit for carrying out the method of the present invention;

FIG. 2 is a right-hand side elevation of the filter separator unit taken looking generally along the line 2—2 of FIG. 1;

Figure 11:
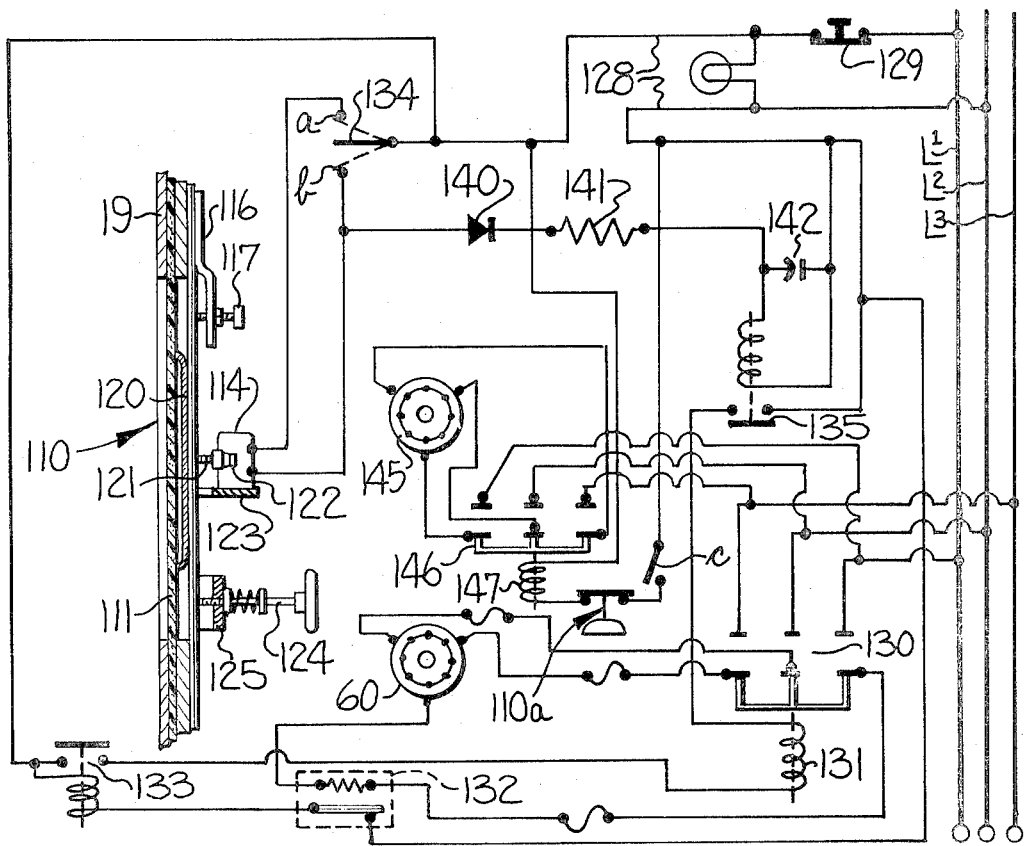
Figure 10:
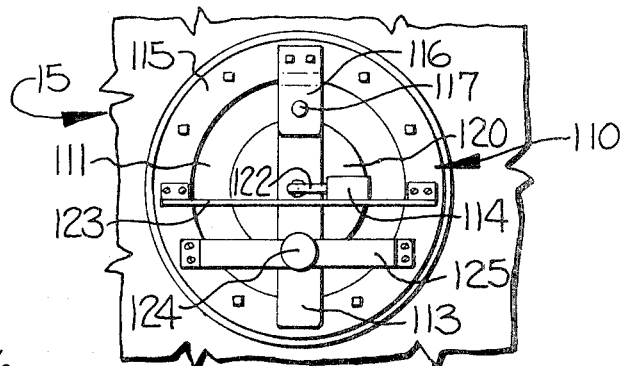
Figure 9:
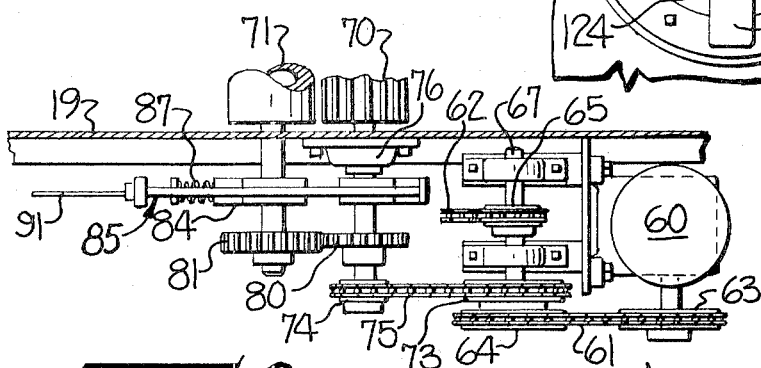

FIG. IS A left-hand side elevation looking at the opposite side of the filter separator unit from that shown in FIG. 2;

FIGS. 4 and 5 are enlarged fragmentary views particularly illustrating sealing means between opposite ends of the filter drum and the confining casing therefor;

FIG. 6 is an enlarged fragmentary vertical sectional view taken substantially along line 6—6 in FIG. 1;

FIG. 7 is a somewhat schematic vertical sectional view through the filter separator unit taken substantially along line 7—7 in FIG. 1 and showing the same connected to textile machinery through duct means and an associated airstream producing fan;

FIG. 8 is a schematic sectional plan view taken substantially along line 8—8 in FIG. 7;

FIG. 9 is a fragmentary sectional plan view taken substantially along line 9—9 in FIG. 2 and showing the drive mechanism for the filter drum and the associated doffer rollers;

FIG. 10 is an enlarged view of the novel pressure responsive switch assembly shown in the upper right-hand portion of FIG. 2; and FIG. 11 is an enlarged vertical sectional view through the pressure switch assembly of FIG. 10 with an associated integrating circuit for controlling the operation of the fan and the filter drum drive mechanism of FIGS. 2 and 9.

Referring more specifically to the drawings, the novel filter separator unit comprises a substantially rectangular cabinet or boxlike casing 15 (FIGS. 1, 2, 3, 7 and 8), preferably made of sheet metal, and formed with readily detachable sides to give easy access to the casing interior. Casing 15 includes end walls 16, 17, sidewalls 18, 19, a top wall 20, and a bottom wall in the form of two inclined, downwardly converging panels 21, 22. The lower proximal edges of panels 21, 22 define a fiber discharge aperture 23 therebetween. Casing 15 may be supported on corner posts 27–30 to accommodate a suitable wheeled bin 31 therebeneath (FIG. 1).

A generally cylindrical filter drum or cage, broadly designated at 33, is rotatably mounted within the lower portion of casing 15, and the lower portion of drum 33 is positioned between inclined panels 21, 22. Filter drum 33 may be formed by an outer cylindrical layer of screen material 34, such as metal gauze fixedly supported on an inner cylindrical layer of perforate material 35, for example expanded steel mesh, having coarser perforations than outer layer 34. The metal gauze may have about 700–800 perforations per square inch therethrough. The inner layer 35 is fixedly mounted, as by welding or otherwise, on a plurality of spaced metal wheels 36 located inside the filter drum. Wheels 36 may have suitable apertures therethrough or may be of a spoked construction. Wheels 36 are fixedly mounted on a filter drum shaft 37 (FIGS. 1, 2 and 3), opposing end portions of which are mounted in suitable bearings 40, 41 carried by sidewalls 18, 19 of casing 15.

It is preferred that low friction, resilient, fireproof seals are provided at opposite ends of filter drum 33 to provide an airtight seal between casing 15 and filter drum 33. By way of example, it will be observed in FIG. 5 that a first end of filter drum 33 loosely extends through a circular opening formed in casing sidewall 19 and is closed externally of casing 15 by a circular closure plate 43 through which shaft 37 extends. The peripheral portion or rim of closure plate 43 extends radially beyond the drum circumference, and a first sealing strip 44 of resilient, low friction, fireproof material, such as polytetrafluoroethylene impregnated with asbestos, is suitably secured to sidewall 19 to close an annular gap between the rim of closure plate 43 and sidewall 19 and provide a low friction airtight seal between sidewall 19 and filter drum 33.

Inside casing 15, the other or second end of filter drum 33 fits around the inner portion of an outlet tube 45 (FIG. 4) which extends through sidewall 18 and is welded or otherwise suitably secured thereto. Outlet tube 45 defines an air exhaust outlet for casing 15. A second sealing strip 46, which may be made from the same type of material as first sealing strip 44, is mounted around the inside surface of the filter drum's second end and snugly surrounds the inner end portion of outlet tube 45 to serve as a sliding airtight seal between filter drum 33 and outlet tube 45.

An air outlet duct or trunking 47 is mounted on the outer end portion of outlet tube 45 and leads to atmosphere. Air laden with waste material, for example textile waste from carding engines, is carried by a pneumatic conveyor or air inlet duct 50 (FIG. 7) through an air inlet 51 of casing 15 into the space surrounding filter drum 33. A fan or fans arranged to blow the fibers into casing 15 under predetermined pressure may be mounted in duct 50 and/or an extraction fan may be mounted in exhaust duct 47. As shown in FIG. 7, the outer end of duct 50 has the outlet of a motor-driven centrifugal fan 52 connected thereto, whose inlet is connected, by a duct 53, to textile machinery schematically identified at 54.

It is important to note that casing air inlet 51 is formed in an upper portion of end wall 16 immediately above the level of filter drum 33, it being further noted that end wall 16 extends substantially parallel with the axis of filter drum 33, so that the fiber-laden or waste-laden airstream produced by fan 52 enters casing 15 flowing in a direction generally tangentially of filter drum 33, which direction of flow contributes favorably to the substantially uniform accumulation of fiber waste upon the outer peripheral surface of filter drum 33. Additionally, the air inlet duct 50, being of substantially lesser cross-sectional area than that of the casing 15, opens into an expansion chamber 56 defined collectively by the outwardly flaring discharge end of duct 50 and by the interior of the upper portion of casing 15 immediately above filter drum 33.

Thus, the waste-laden air expands with consequent reduction in the velocity thereof upon entering casing 15 so that the lighter low-energy waste particles and fibers tend to settle out first on the bat F on those portions of filter drum 33 adjacent expansion chamber 56, but the heavier high-energy particles and fibers tend to travel on through the chamber and then into a narrower flow channel defined between filter drum 33 and the first inclined panel 21 and the adjacent portion of sidewall 17. In passing through the narrower flow channel, the airflow is accelerated, thus accelerating the fibers borne thereby toward a previously cleaned or cleared area of filter drum 33, at which area the velocity or airflow into the filter drum is higher than at any other part of the periphery thereof, and the waste particles and fibers are deposited on the filter drum to build up a layer of fibers and other airborne particles covering the previously cleaned area.

Driving means for intermittently rotating filter drum 33 is located externally of casing 15 and the inlet and outlet ducts 50, 47. Thus, the driving means is positioned outside the path of the waste-laden airstream so that the chance of the driving means being adversely affected or impeded by the waste material is prevented or at least considerably reduced. As shown in FIGS. 1, 2 and 9, the driving means may comprise an electric motor 60 suitably supported by sidewall 19 and connected, as by sprocket chains 61, 62 and sprocket wheels 63, 64, 65 and 66 to one end of filter drum shaft 37. If desired, belts and pulleys may be substituted for the chains and sprocket wheels without departing from the invention. The intermediate sprocket wheels 64, 65 (FIG. 9) are fixed on a jackshaft 67 suitably supported for rotation on the casing sidewall 19.

Compacting doffer roll means are spaced a substantial distance around filter drum 33 from air inlet 51 and positioned adjacent the periphery of filter drum 33. As best shown in FIGS. 6, 7 and 9, the doffer roll means comprises a pair of first and second doffer rollers or clearing rollers 70, 71 in nip association extending longitudinally of and immediately beneath filter drum 33, adjacent and in cooperating relation with the fiber discharge aperture 23 defined between the lower proximal portions of inclined panels 21, 22.

Doffer rollers 70, 71 are preferably made from metal and, although either or both rollers may be fluted, it is preferred that first roller 70 is fluted and that second roller 71 is smooth. First doffer roller 70 occupies a given position spaced a substantial distance from the periphery of filter drum 33 while second doffer roller 71 is yieldably biased toward the periphery of filter drum 33. Motor 60 drives first doffer roller 70 intermittently through the medium of sprocket wheels 73, 74 and an endless sprocket chain 75, the sprocket wheel 73 being fixed on jackshaft 67, and sprocket wheel 74 being fixed on the reduced corresponding end of first doffer roller 70. Each reduced opposite end portion of first doffer roller 70 is journaled in a bearing 76 suitably secured to a fixed adjacent the corresponding sidewall of casing 15 (FIG. 9). A gear 80, fixed on one reduced end of first doffer roller 70, meshes with gear 81 fixed on the corresponding reduced end of second doffer roller 71 for driving the same.

In addition to being yieldably biased toward filter drum 33, second doffer roller 71 is biased also toward first doffer roller 70. To this end, reduced opposite end portions of second doffer roller 71 are mounted in bearings 84 of respective cradles 85, 85' disposed adjacent the respective sidewalls 19, 18 of casing 15 and pivotally mounted on reduced opposite end portions of first doffer roller 70. Each bearing 84 is slidably mounted in its cradle and urged toward the axis of first doffer roller 70 by a spring 87 whose effective pressure is adjustable by a nut and screw arrangement 90. Each cradle 85, 85' has an arm 91 extending outwardly beyond the adjacent casing sidewall and connected to the upper end of a link 92 surrounded by a compression spring 93. Links 92 are adjustably and slidably mounted in a bar 94 common to both cradles 85, 85' (FIG. 1). Bar 94 is mounted in supports 95 carried by and projecting outwardly from housing sidewalls 18, 19. The lower portions of links 92 loosely penetrate bar 94 and have adjustment nuts 96 threaded onto the lower ends thereof for adjusting the effective upward pressure imparted to cradles 85, 85' by springs 93, to, in turn, bias second doffer roller 71 toward the periphery of filter drum 33. Sidewalls 18, 19 may be provided with slots, not shown, permitting upward and downward movement of the reduced end portions of second doffer roller 71.

As heretofore stated, rollers 70, 71 are positioned adjacent and partially within fiber discharge aperture 23. In order to substantially prevent leakage of air through fiber discharge aperture 23 between doffer rollers 70, 71 and inclined panels 21, 22, suitable resilient or flexible first and second sealing members 100, 101 preferably formed from strips of spring steel, are suitably secured with respect to panels 21, 22 along opposite sides of aperture 23 and are inherently yieldably urged into engagement with distal surfaces of rollers 70, 71 (FIG. 6).

First doffer roller 70 is spaced from filter drum 33, as heretofore described. Accordingly a third flexible sealing member 102, of spring steel or the like, is fixed to inclined panel 21, curves upwardly past first doffer roller 70, and has a sealing strip 103 fixed thereon and biased toward filter drum 33 by the inherent tendency for the spring steel sealing member 102 to straighten out. The sealing strip 103 also is preferably made from resilient, low friction, fireproof material such as polytetrafluoroethylene/asbestos and cooperates with second doffer roller 71 to define a shielded area for the filter drum 33 through which the air stream does not normally flow.

Control means is provided, responsive to a predetermined rise or increase in air pressure within housing 15 (back pressure) incident to buildup of fibers on filter drum 33, for momentarily rotating filter drum 33 and doffer rolls 70, 71 to remove a portion of the bat F from the drum and to thereby expose a sufficient area of the periphery of the drum beyond sealing strip 103 so that the airstream may flow freely therethrough to compensate for the increase in air pressure. Accordingly, the operation of motor 60 is controlled by an electrical means which is, in turn, controlled by a pressure switch assembly, to be later described, which may be mounted inside casing 15 or in the duct 50. A preferred embodiment of the pressure switch assembly, broadly designated at 110, is shown in FIGS. 2, 10 and 11 wherein it will be observed that a diaphragm 111 of relative large diameter; e.g., 8 to 12 inches, is mounted with one face thereof exposed to the air in the air inlet duct 50 or the expansion chamber 56 of casing 15. In this instance, it will be observed in FIG. 11 that diaphragm 111 is suitably secured to the outer surface of casing sidewall 19 in alignment with a corresponding aperture formed in casing sidewall 19. It is preferred that diaphragm 11 is made from polytetrafluoroethylene/asbestos or other suitable resilient, fireproof material.

Diaphragm 111 is movable by static air pressure within casing 15 against the action of adjustable spring means in the form of a composite leaf spring 113 to close first, a normally open, electrical pressure switch 114 connected in an integrating circuit arranged to judge trends in pressure conditions within housing 15 rather than erratic pressure fluctuations. The pressure switch assembly 110 can be adjusted to accommodate a wide range of pressure variations by varying the number of flat steel leaves or strips of which leaf spring 113 is constructed. As shown in FIGS. 10 and 11, the upper end only of leaf spring 113 is secured to a rigid ring 115 which serves to secure diaphragm 111 to casing sidewall 19. The upper portion of leaf spring 113 is provided with a bracket 116 which extends downwardly and whose lower portion is spaced outwardly from leaf spring 113 to provide for adjustment of the sensitivity of leaf spring 113 by adjustment screws 117 threaded through the lower portion of bracket 116 and which are adapted to engage the outer surface of leaf spring 113 adjacent its upper end.

A disc 120, of substantially lesser diameter than the internal diameter of ring 115, may be provided between leaf spring 113 and diaphragm 111. A stem or projection 121 on a medial portion of leaf spring 113 engages the inner surface of an actuator arm 122 of pressure switch 114. Arm 122 is normally biased to open position toward leaf spring 113 by conventional means, not shown. Switch 114 is suitably secured to a transverse bar 123 whose opposite end portions are secured to ring 115 as best shown in FIG. 10. Fine adjustments may be made in the sensitivity of leaf spring 113 and diaphragm 111 by a manually operable adjustment screw 124 threadedly penetrating another transverse bar 125 and having its opposite end portions suitably secured to ring 115.

Various forms of pressure switches are known in the art. Some types of pressure switches operate in response to differential pressure, others operate in response to a positive pressure only and still others operate in response to a negative pressure only. The limits to which a pressure switch assembly can be made to operate depend primarily upon the sensitivity of the diaphragm. In some applications however, very sensitive diaphragms may produce problems in the operation of the associated control circuit, especially in instances in which air entering a corresponding chamber does so at very high velocity causing considerable turbulence in the chamber itself. Being very sensitive, such diaphragms will cause the electrical control circuit to switch on and off at very frequent intervals. In order to obviate this problem, the control circuit of FIG. 11 is provided for controlling the operation of electric motor 60 in accordance with variations in static pressure within casing 15, the pressure switch assembly 110 being of the positive pressure type, as is preferred. It should be noted that pressure switch 114 is normally open and will be closed or activated each time diaphragm 111 is moved outwardly a predetermined distance from its relaxed position by air pressure within casing 15.

Accordingly, due to the turbulence of the high-pressure air entering casing 15, diaphragm 111 is subject to constant vibration. Unless such vibration is controlled either mechanically or electrically, this would result in the motor 60 being repeatedly turned on and off within relatively short periods of time which, in turn, would case the usual overload circuit breaker or breakers associated with such motors to break the circuit to the motor and render the drive means for the filter drum 15 and doffer rolls 70, 71 inoperative. The electrical circuit of FIG. 11 is arranged so as to render relatively short-term active intervals of pressure switch 114 ineffective to energize motor 60, and to render relatively long term active intervals of switch 114 effective to energize motor 60. As shown, motor 60 is arranged to be electrically connected to lead conductors $L^1$, $L^2$, $L^3$ from a high-voltage source of electrical energy through the normally open contacts of a main relay 130. The coil 131 of main relay 130 is arranged in series with pressure switch 114 and a pair of low-voltage conductors 128 electrically connected to the lead conductors $L^1$, $L^2$.

A self-locking pushbutton master switch 129, a manually operable, double-throw switch 134 and the switch element of an auxiliary relay 135 are also arranged in series with coil 131 of main relay 130. A suitable overload relay circuit breaker 132 has its thermal element or resistor interposed in one of the leads between motor 60 and main relay 130. The coil of an overload relay 133 and the switch element of circuit breaker 132 are arranged in series with locking switch 129 and in parallel with the switch element of relay 133. The latter switch element is in series with main relay coil 131. Thus, upon occurrence of an overload condition of motor 60, circuit breaker 132 will interrupt the flow of current through the coil of relay 133 which will, in turn, stop the flow of current to coil 131 and stop the motor 60. Such overload condition may occur, for example, in the event of a blockage inside casing 15 hindering or obstructing rotation of filter drum 33 and/or doffer rollers 70, 71, such as an excessive accumulation of fibers between drum 33 and rollers 70, 71 caused by failure of the rollers to remove the bat F from filter drum 33.

According to the invention, the low-voltage circuit also comprises time delay means including a diode 140, a resistor 141 and a capacitor 142, the diode 140 and resistor 141 being in series with the coil of auxiliary relay 135, and the capacitor 142 being in parallel with the latter coil. When manual switch 134 occupies a first position in which it engages contact a of FIG. 11, the operation of electric motor 60 then is entirely automatic in response to pressure switch assembly 110, since pressure switch 114 is then arranged in series with conductors 128, diode 140, resistor 141 and the coil of auxiliary relay 135.

Shown in FIG. 11 is an electric motor 145 for driving fan 52 (FIG. 7) and to which current is directed from lead conductors $L^1$, $L^2$, $L^3$ through a fan motor relay 146. The coil 147 of relay 146 is connected, in series with a switch c and a second, normally closed, pressure switch 110a, to low-voltage conductors 128. Pressure switch 110a, although normally closed, should be substantially identical to pressure switch assembly 110 and mounted in air inlet duct 50 or on any of the walls of housing 15, as desired, so as to be subject to the pressure of the fiber-conveying airstream flowing into housing 15.

Accordingly, second pressure switch should include components corresponding to the components 135, 140, 141, 142 associated with pressure switch assembly 110 so as to provide for an even flow of current to fan motor 145 irrespective of high-frequency vibrations of the diaphragm of second pressure switch 110a. Since the components associated with second pressure switch 110a may be arranged in substantially the same manner as those associated with pressure switch assembly 110, a separate illustration and description thereof is deemed unnecessary.

Although the use of second pressure switch 110a is optional, it is provided as a safety measure in the event of an abnormal overload condition of motor 60 and failure of circuit breaker 132 to then stop motor 60. As stated earlier herein such abnormal overload condition may occur in the event of a blockage inside casing 15 hindering or obstructing rotation of filter drum 33 and/or doffer rollers 70, 71, such as an excessive accumulation of fibers between drum 33 and rollers 70, 71.

Second pressure switch 110a is adjusted to open and stop the flow of current to relay coil 147 only upon the occurrence of an intolerably high back pressure in housing 15 substantially above the predetermined maximum tolerable back pressure at which the coil of auxiliary relay 135 is caused to be energized. Thus, upon occurrence of such excessively high pressure in housing 15, fan 52 will stop and the following consequent reduction of pressure in housing 15 will permit diaphragm 111 of pressure switch assembly 110 to open first pressure switch 114 and auxiliary relay 135 to stop filter drum drive motor 60. Switch c may be of any well-known type which will open automatically upon a break in the flow of current therethrough so that fan 52 will not restart until switch c is closed.

METHOD OF OPERATION

In operation, it is to be assumed that switches 129, c, 110a (FIG. 11) are closed so that relay 146 is closed to operate fan 52 and direct a fiber-laden airstream under predetermined pressure through air inlet 51 into expansion chamber 56 of casing 15, so that the airstream approaches filter drum 33 in substantially tangential relation to the periphery thereof.

The velocity of the fiber-laden airstream at normal operating pressure may be in the range of about 160–300 feet per minute at a volume of about 10,000–16,000 cubic feet per minute, for example, depending upon the type of textile equipment from which the filter separator unit is being used. The fibers may be fed at different rates or intermittently, as desired. The block 54 represents any desired type of textile equipment from which fiber waste is to be removed. For example, the filter separator unit may be used for the disposition of fly in various textile rooms, or it may be connected directly to carding engines, combers, spinning frames, twisters or other textile machinery.

It is also to be assumed that there is a relatively small cleared air of filter drum 33 exposed to flow of air therethrough adjacent sealing strip 103, as shown in the right-hand portion of FIG. 6. Also, pressure switch 114 is open, with the exception of the short-term closed periods thereof incident to high-frequency vibration of diaphragm 111, and relays 130, 133, 135 are open so that motor 60 is not operating and filter drum 33 and doffer rollers 70, 71 are stationary.

During such condition of the apparatus, the air passes through filter drum 33 and to the atmosphere, but because of the relatively reduced velocity of the airstream upon entering expansion chamber 56, the lighter low-energy fibers and other particles tend to settle out from the airstream onto the bat F on those portions of the filter drum periphery adjacent expansion chamber 56. The heavier higher energy particles and fibers tend to travel on through chamber 56 and then into the narrower flow channel defined between filter drum 33 and adjacent portions of the end wall 17 and the inclined panel 21. In so doing, the velocity of the airstream is accelerated, thus accelerating the heavier particles and fibers borne thereby toward the cleared area of the filter drum as the airstream passes through the relatively small cleared area of filter drum 33 adjacent sealing strip 103, as best shown in FIG. 6 and 7. It should be noted that the velocity of the airstream into filter drum 33 is higher at the cleared area than at any other part of the drum periphery and the waste particles and fibers are deposited on the filter drum to build up a layer of fibers covering the previously cleared area.

As the fibrous bat builds up on the periphery of filter drum 33, the bat increases the filtering efficiency of the filter drum 15. Eventually, the bat F becomes so thick that the air has difficulty in entering the filter drum and a back pressure builds up within the casing 15 and duct 50.

In the meantime, during the increase in back pressure within casing 15, the high-pressure airstream is naturally turbulent to such extent as to impart vibrations to diaphragm 111 (FIG. 11) of such magnitude and frequency as to repeatedly close and open pressure switch 114. As heretofore indicated, high-frequency fluctuations of the introduction of electrical energy to motor 60 are deleterious and will cause the usual circuit breakers associated therewith, such as circuit breaker 132 (FIG. 11), to interrupt the flow of current to motor 60 and render the drive means for the filter drum and the doffer rollers 70, 71 inoperative. However, with the manual switch 134 (FIG. 11), occupying the first position in engagement with contact a, diode 140 then allows a single phase current to flow in one direction, during which resistor 141 limits the charging rate of capacitor 142 which, in turn, smooths out the pulses received from pressure switch 114 as effected by high-frequency vibration of diaphragm 111.

As the back pressure in casing 15 increases, the open periods of pressure switch 114 becomes shorter with respect to the closed periods thereof as the diaphragm 111 is forced outwardly of its normal position for periods of relatively increasing duration and holds pressure switch 114 in closed position. Thus, when the back pressure reaches predetermined tolerable maximum pressure above the normal operating pressure produced by fan 52, capacitor 142 becomes fully charged and its time delay function will no longer be effective as it discharges electrical current to the coil of auxiliary relay 135. As heretofore stated, second pressure switch 110a functions in a manner similar to that of first pressure switch 114 in compensating for high-frequency vibrations of its associated diaphragm so that the flow of current to fan motor 145 will be interrupted only upon occurrence of an intolerably excessive back pressure in casing 15 and inlet duct 50.

It is apparent, by reference to FIG. 11, that the discharge of electrical current through the coil of auxiliary relay 135 closes the same and completes a circuit to the coil 131 of main relay 130, causing the contacts thereof to close and thereby energize electric motor 60. Motor 60 then imparts rotation to filter drum 33 in a counterclockwise direction in FIGS. 6 and 7, and continues to do so until a falling trend of the back pressure in casing 15 is established. During this falling trend in back pressure, pressure fluctuations again repeatedly close and open switch 114, but this time the open periods are of progressively increasing length so that capacitor 142 continues to discharge through the relay coil to keep it energized until the open periods increase to such extent that the charge is dissipated, whereupon the coil of relay 135 deenergizes and the motor 60 stops.

It is important to note that during each step in rotation of filter drum 33, its surface closest to the inlet 51 moves in the opposite direction from that of the flow of the airstream. Also, a portion of the area of filter drum 33 previously shielded between second doffer roller 71 and sealing strip 103, and from which the bat F had previously been stripped, is exposed beyond sealing strip 103 to the free flow of the airstream therethrough. At the same time, second doffer roller 71 is compressing the bat against filter drum 33 to compact the same as the bat passes partially around second doffer roller 71 and through the nip of doffer rolls 70, 71 to be discharged in web form into truck 31. Opposed sides of the casing 15 may be provided with downwardly converging guide chutes 150 for guiding and reducing the width of the bat so that it readily enters the open top of truck 31. It is apparent that, upon a substantial bat of fibers building up on the exposed previously cleared area of filter drum 33, a repeat cycle in the operation of the apparatus will be effected as long as switch 134 remains in engagement with the contact a of FIG. 11.

It is thus seen that there is provided a novel filter separator unit for carrying out the novel method of this invention in which a fiber waste-laden airstream enters a casing through an expansion chamber and initially approaches a filter drum in tangential relation thereto at a location remote from a cleared area of the filter drum, such that the waste-laden air entering the casing has to travel around a considerable portion of the drum periphery in a direction of flow contrary to the direction of intermittent rotation of the drum in order to reach the cleared area. For example, if the clearing or doffer rollers 70, 71 are disposed at the bottom of the casing, as shown, it follows that the cleared area of the filter drum is also located adjacent the bottom of the casing, and in this circumstance the air inlet may, with advantage, be positioned adjacent the top of the casing at a location substantially diametrically opposed from that of the cleared area.

The use of steel doffer rollers and the facility by which second roller 71 is applied with pressure against both filter drum 33 and first roller 70 enables the fibrous bat F to be highly compressed so that the space needed to store the bat can be used very efficiently. Furthermore, by providing means by which the second doffer roller 71 can be applied against both the filter drum 33 and the first doffer roller 70 with adjustably variable pressures, these pressures can be varied as desired to suit the nature of the waste.

It is seen further that, by providing a diaphragm 111 of relatively large area (about 8 to 12 inches in diameter), this increases the resultant force of the pressurized air in the casing acting on the diaphragm to increase the sensitivity thereof enabling it to respond efficiently to pressure changes. The electrical integrating circuit may be very simple, but nevertheless, it ensures that a smooth flow of current is introduced to the drum drive motor 60 only when it is needed. The similar diaphragm of second pressure switch 110a and its integrating circuit also ensures that a smooth flow of current is introduced to fan motor 145 as long as an intolerable excessively high back pressure does not develop within casing 15 and inlet duct 50.

The use of steel and polytetrafluoroethylene/asbestos in the construction of the filter separator unit virtually eliminates the chance of a fire spreading from the unit to the surroundings, and also greatly reduces the chance of a fire doing serious damage to the filter separator unit itself.

In the drawings and specification there has been set forth a preferred embodiment of the invention and although specific terms are employed, they are used in a generic and descriptive sense only, and not for purposes of limitation.

I claim:

1. Apparatus for separating entrained textile fibers from a conveying airstream and collecting the fibers comprising a casing having opposing side and end walls and an air inlet in an upper end wall portion thereof and an air outlet in a lower portion of one of said sidewalls, means directing the fiber-conveying airstream through said air inlet into an upper portion of said casing at a predetermined pressure, a cylindrical filter drum positioned within said casing between opposing sidewalls and axially connected with said air outlet for collecting the fibers on the periphery of the drum in the form of a porous batt, drive means for rotating said filter drum in a direction opposite to the flow of the conveying airstream passing through said air inlet, doffer means driven by said drive means and positioned in the lower portion of said casing adjacent the lower periphery of said filter drum and movable in relation to the rotation of said filter drum for removing the fibrous batt collected on said filter drum, means including a pressure responsive diaphragm positioned in said casing and responsive to a predetermined back pressure of the air within said casing incident to buildup of fibers on said filter drum for actuating said drive means to rotate said filter drum only a small circumferential extent and to actuate said doffer means until a small circumferential area on the filter drum has been cleared of the fibrous batt so as to relieve the back pressure within said casing on said diaphragm and thereby inactivate the drive means to in turn stop rotation of the filter drum and inactivate the doffer means, and said filter drum being located relative to said air inlet so that the upper periphery thereof is closely adjacent to and below a lower portion of said air inlet to guide the conveying airstream flowing into the casing from the air inlet thereof generally tangentially across the upper portion of the filter drum then down and around the far side thereof while the air flows through the filter drum and axially outwardly of the filter drum through said air outlet as the entrained fibers are deposited upon the periphery of said filter drum in the form of a substantially even porous batt to increase the filtration of said filter drum, said filter drum also being so located relative to said casing that a relatively narrower flow channel for the fiber-conveying airstream is provided between the filter drum and casing along said far side of the filter drum for accelerating the heavier particles and fibers borne by the airstream toward the small area of the filter drum cleared by said doffer means whereby the buildup of fibers on the cleared area of the filter drum is accelerated to rapidly form a porous batt thereon for increasing the filtration efficiency of the filter drum.

2. Apparatus according to claim 1, wherein said air outlet is open to the interior of said filter drum, and fire-resistant sealing members positioned between each end of said filter drum and the adjacent sides of said casing.

3. A structure according to claim 1, wherein said drive means includes an electric motor, and wherein said means for actuating said drive means comprises a pressure switch assembly including a normally inactive pressure switch means interposed in an electrical circuit to said motor and also including said diaphragm for operating said switch means and being subject to back pressure of the fiber-conveying airstream in said casing, and wherein said diaphragm also is subject to high-frequency vibration incident to turbulence of the airstream such as to repeatedly activate and inactivate said switch means at short intervals, and time delay means interposed in said circuit between said switch means and said motor and being operable to prevent the flow of current effected by relatively short term activations of said switch means resulting from said high-frequency vibration of said diaphragm, but to effect the flow of current to said motor upon relatively long-term activations of said switch means attendant to said predetermined back pressure within said casing.

4. A structure according to claim 3, wherein said circuit further includes a relay having a normally open switch element in series with said motor and also having a coil for closing said switch element upon energization of said coil, said time delay means comprising a diode and a resistor in series with said coil and said pressure switch means and in parallel with said switch element, and a capacitor in series with said diode, said resistor and said pressure switch but in parallel with said coil, said diode and resistor serving to prevent said capacitor from reaching a full charge during said short-term activation of said pressure switch, but said capacitor reaching full charge to energize said relay coil upon occurrence of said long-term activations of said pressure switch.

5. Apparatus according to claim 1, wherein the rotational axis of said filter drum extends substantially horizontally, said casing is provided with a discharge aperture in its lower portion adjacent the lower portion of said drum, said doffer means comprises first and second doffer rollers adjacent said discharge aperture, and means are provided for yieldably biasing said second doffer roller toward said first doffer roller and toward said rum to compress the batt against and withdraw the same from said drum during rotation thereof.

6. Apparatus according to claim 5, wherein said first doffer roller is spaced away from said drum, sealing means adjacent said discharge aperture and extending between each doffer roller and said casing and also extending between said drum and said casing to define a shielded area for that portion of said drum immediately above said doffer rollers and from which said doffer rollers remove a portion of the bat during rotation of said drum and said doffer rollers.

7. Apparatus according to claim 6, wherein said casing includes a pair of downwardly converging bottom panels forming said lower portion of said casing and defining said discharge aperture therebetween, said sealing means comprising first and second flexible sealing members engaging the respective first and second doffer rollers and secured to the corresponding bottom panels, and a third flexible sealing member secured to that bottom panel adjacent said first doffer roller and having a fire-resistant sealing strip thereon engaging the periphery of said filter drum.

* * * * *

UNITED STATES PATENT OFFICE
CERTIFICATE OF CORRECTION

Patent No. 3,628,313  Dated December 21, 1971

Inventor(s) Arnold Broadbent

It is certified that error appears in the above-identified patent and that said Letters Patent are hereby corrected as shown below:

Column 2, Line 17, after FIG. insert --3--. Column 4, Line 26, "a" should be --or--. Column 5, Line 23, the numeral "11" should be --111--. Column 6, Line 12, "case" should be --cause--. Column 7, Line 39, "from" should be --with--.

Signed and sealed this 6th day of June 1972.

(SEAL)
Attest:

EDWARD M. FLETCHER, JR.
Attesting Officer

ROBERT GOTTSCHALK
Commissioner of Patents